(12) United States Patent
Persson et al.

(10) Patent No.: US 10,513,094 B2
(45) Date of Patent: Dec. 24, 2019

(54) METHOD OF MANUFACTURING A BUILDING PANEL

(71) Applicant: Välinge Innovation AB, Viken (SE)

(72) Inventors: Hans Persson, Perstorp (SE); Peter Wingårdh, Wolouve Saint-Pierre (BE)

(73) Assignee: VALINGE INNOVATION AB, Viken (SE)

( * ) Notice: Subject to any disclaimer, the term of this patent is extended or adjusted under 35 U.S.C. 154(b) by 0 days.

(21) Appl. No.: 14/516,957

(22) Filed: Oct. 17, 2014

(65) Prior Publication Data

US 2015/0111055 A1    Apr. 23, 2015

(30) Foreign Application Priority Data

Oct. 18, 2013  (SE) ...................... 1351240

(51) Int. Cl.
*B32B 37/00* (2006.01)
*B32B 21/00* (2006.01)
*E04C 2/00* (2006.01)
*B32B 21/06* (2006.01)

(52) U.S. Cl.
CPC .......... *B32B 21/06* (2013.01); *B32B 2250/03* (2013.01); *B32B 2260/028* (2013.01); *B32B 2264/065* (2013.01); *B32B 2607/00* (2013.01); *Y10T 428/31993* (2015.04)

(58) Field of Classification Search
CPC ......... B32B 37/00; B32B 21/00; B32B 21/06; B32B 21/02; B32B 21/12; B32B 37/24; E04C 2/00; E04C 2/24; E04C 15/00; E04C 15/102; E04C 15/107
See application file for complete search history.

(56) References Cited

U.S. PATENT DOCUMENTS

| 2,587,064 A | 2/1952 | Rapson |
| 2,831,793 A | 4/1958 | Elmendorf |
| 2,962,081 A | 11/1960 | Dobry et al. |
| 3,032,820 A | 5/1962 | Johnson |

(Continued)

FOREIGN PATENT DOCUMENTS

| AU | 80284/75 | 6/1975 |
| CA | 2 557 096 A1 | 7/2005 |

(Continued)

OTHER PUBLICATIONS

Persson, Hans, et al., U.S. Appl. No. 14/738,274, entitled "Powder Based Balancing Layer," filed Jun. 12, 2015.

(Continued)

*Primary Examiner* — Jacob T Minskey
*Assistant Examiner* — Matthew Hoover
(74) *Attorney, Agent, or Firm* — Buchanan Ingersoll & Rooney P.C.

(57) ABSTRACT

A method of manufacturing a building panel including a core, a decorative layer and a balancing layer, including mechanically processing production waste including a resin impregnated paper to processed production waste, applying a first mix including said processed production waste and a thermosetting binder on a first surface of a core, applying a decorative layer on a second surface of the core, and curing the first mix to a balancing layer of the building panel. Also, a building panel formed by such a method.

24 Claims, 3 Drawing Sheets

(56) References Cited

U.S. PATENT DOCUMENTS

| | | |
|---|---|---|
| 3,135,643 A | 6/1964 | Michl |
| 3,286,006 A | 11/1966 | Annand |
| 3,308,013 A | 3/1967 | Bryant |
| 3,325,302 A | 6/1967 | Hosfeld |
| 3,342,621 A | 9/1967 | Point et al. |
| 3,345,234 A | 10/1967 | Jecker et al. |
| 3,373,070 A | 3/1968 | Fuerst |
| 3,426,730 A | 2/1969 | Lawson et al. |
| 3,463,653 A | 8/1969 | Letter |
| 3,486,484 A | 12/1969 | Bullough |
| 3,533,725 A | 10/1970 | Bridgeford |
| 3,540,978 A | 11/1970 | Ames |
| 3,565,665 A | 2/1971 | Stranch et al. |
| 3,673,020 A | 6/1972 | De Jaeger |
| 3,846,219 A | 11/1974 | Kunz |
| 3,880,687 A | 4/1975 | Elmendorf et al. |
| 3,897,185 A | 7/1975 | Beyer |
| 3,897,588 A | 7/1975 | Nohtomi |
| 3,914,359 A | 10/1975 | Bevan |
| 3,961,108 A | 6/1976 | Rosner et al. |
| 4,052,739 A | 10/1977 | Wada et al. |
| 4,093,766 A | 6/1978 | Scher et al. |
| 4,131,705 A | 12/1978 | Kubinsky |
| 4,313,857 A | 2/1982 | Blount |
| 4,337,290 A | 6/1982 | Kelly et al. |
| 4,420,525 A | 12/1983 | Parks |
| 4,430,375 A | 2/1984 | Scher et al. |
| 4,474,920 A | 10/1984 | Kyminas et al. |
| 4,890,656 A | 1/1990 | Ohsumi et al. |
| 5,034,272 A | 7/1991 | Lindgren et al. |
| 5,040,582 A | 8/1991 | Hsu et al. |
| 5,206,066 A | 4/1993 | Horacek |
| 5,246,765 A | 9/1993 | Lussi et al. |
| 5,258,216 A | 11/1993 | Von Bonin et al. |
| 5,314,554 A | 5/1994 | Owens |
| 5,422,170 A | 6/1995 | Iwata et al. |
| 5,466,511 A | 11/1995 | O'Dell et al. |
| 5,543,193 A | 8/1996 | Tesch |
| 5,569,424 A | 10/1996 | Amour |
| 5,601,930 A | 2/1997 | Mehta et al. |
| 5,604,025 A | 2/1997 | Tesch |
| 5,609,966 A | 3/1997 | Perrin et al. |
| 5,766,522 A | 6/1998 | Daly et al. |
| 5,827,788 A | 10/1998 | Miyakoshi |
| 5,855,832 A | 1/1999 | Clausi |
| 5,891,564 A | 4/1999 | Schultz et al. |
| 5,925,296 A | 7/1999 | Leese |
| 5,942,072 A | 8/1999 | McKinnon |
| 6,036,137 A | 3/2000 | Myren |
| 6,103,377 A | 8/2000 | Clausi |
| 6,238,750 B1 | 5/2001 | Correll et al. |
| 6,324,809 B1 | 12/2001 | Nelson |
| 6,468,645 B1 | 10/2002 | Clausi |
| 6,521,326 B1 | 2/2003 | Fischer et al. |
| 6,537,610 B1 | 3/2003 | Springer et al. |
| 6,617,009 B1 | 9/2003 | Chen |
| 6,620,349 B1 | 9/2003 | Lopez |
| 6,769,217 B2 | 8/2004 | Nelson |
| 6,773,799 B1 | 8/2004 | Persson et al. |
| 6,803,110 B2 | 10/2004 | Drees et al. |
| 6,926,954 B2 | 8/2005 | Shuren et al. |
| 6,991,830 B1 | 1/2006 | Hansson et al. |
| 7,022,756 B2 | 4/2006 | Singer |
| 7,485,693 B2 | 2/2009 | Matsuda et al. |
| 7,811,489 B2 | 10/2010 | Pervan |
| 8,349,234 B2 | 1/2013 | Ziegler et al. |
| 8,349,235 B2 | 1/2013 | Pervan et al. |
| 8,419,877 B2 | 4/2013 | Pervan et al. |
| 8,431,054 B2 | 4/2013 | Pervan et al. |
| 8,480,841 B2 | 7/2013 | Pervan et al. |
| 8,481,111 B2 | 7/2013 | Ziegler et al. |
| 8,617,439 B2 | 12/2013 | Pervan et al. |
| 8,663,785 B2 | 3/2014 | Ziegler et al. |
| 8,728,564 B2 | 5/2014 | Ziegler et al. |
| 8,784,587 B2 | 7/2014 | Lindgren et al. |
| 8,920,874 B2 | 12/2014 | Ziegler et al. |
| 8,920,876 B2 | 12/2014 | Vetter et al. |
| 8,993,049 B2 | 3/2015 | Pervan |
| 9,085,905 B2 | 7/2015 | Persson et al. |
| 9,181,698 B2 | 11/2015 | Pervan et al. |
| 9,255,405 B2 | 2/2016 | Pervan et al. |
| 9,296,191 B2 | 3/2016 | Pervan et al. |
| 9,352,499 B2 | 5/2016 | Ziegler et al. |
| 9,403,286 B2 | 8/2016 | Vetter et al. |
| 9,410,319 B2 | 8/2016 | Ziegler et al. |
| 9,556,622 B2 | 1/2017 | Pervan et al. |
| 9,783,996 B2 | 10/2017 | Pervan et al. |
| 10,017,950 B2 | 7/2018 | Pervan |
| 10,100,535 B2 | 10/2018 | Pervan et al. |
| 10,214,913 B2 | 2/2019 | Persson et al. |
| 10,286,633 B2 | 5/2019 | Lundblad et al. |
| 10,315,219 B2 | 6/2019 | Jacobsson |
| 10,364,578 B2 | 7/2019 | Pervan |
| 10,392,812 B2 | 8/2019 | Pervan |
| 2001/0006704 A1 | 7/2001 | Chen et al. |
| 2001/0009309 A1 | 7/2001 | Taguchi et al. |
| 2002/0054994 A1 | 5/2002 | Dupre et al. |
| 2002/0100231 A1 | 8/2002 | Miller |
| 2002/0155297 A1 | 10/2002 | Schuren |
| 2003/0056873 A1 | 3/2003 | Nakos et al. |
| 2003/0059639 A1 | 3/2003 | Worsley |
| 2003/0102094 A1 | 6/2003 | Tirri et al. |
| 2003/0208980 A1 | 11/2003 | Miller et al. |
| 2004/0123542 A1 | 7/2004 | Grafenauer |
| 2004/0191547 A1 | 9/2004 | Oldorff |
| 2004/0202857 A1 | 10/2004 | Singer |
| 2004/0206036 A1 | 10/2004 | Pervan |
| 2004/0237436 A1 | 12/2004 | Zuber et al. |
| 2004/0250911 A1 | 12/2004 | Vogel |
| 2005/0003099 A1* | 1/2005 | Quist .................. B05D 3/0209 427/532 |
| 2005/0079780 A1 | 4/2005 | Rowe et al. |
| 2005/0193677 A1 | 9/2005 | Vogel |
| 2005/0252130 A1 | 11/2005 | Martensson |
| 2006/0008630 A1 | 1/2006 | Thiers et al. |
| 2006/0024465 A1 | 2/2006 | Briere |
| 2006/0032175 A1 | 2/2006 | Chen et al. |
| 2006/0070321 A1 | 4/2006 | Au |
| 2006/0145384 A1 | 7/2006 | Singer |
| 2006/0182938 A1 | 8/2006 | Oldorff |
| 2006/0183853 A1 | 8/2006 | Sczepan |
| 2007/0055012 A1 | 3/2007 | Caldwell |
| 2007/0066176 A1 | 3/2007 | Wenstrup et al. |
| 2007/0166516 A1 | 7/2007 | Kim et al. |
| 2007/0184244 A1 | 8/2007 | Doehring |
| 2007/0207296 A1 | 9/2007 | Eisermann |
| 2007/0218260 A1 | 9/2007 | Miclo et al. |
| 2007/0224438 A1 | 9/2007 | Van Benthem et al. |
| 2007/0256804 A1 | 11/2007 | Garcis Espino et al. |
| 2008/0000417 A1 | 1/2008 | Pervan et al. |
| 2008/0032120 A1 | 2/2008 | Braun |
| 2008/0090032 A1 | 4/2008 | Perrin et al. |
| 2008/0176039 A1 | 7/2008 | Chen et al. |
| 2008/0263985 A1 | 10/2008 | Hasch et al. |
| 2009/0056257 A1 | 3/2009 | Mollinger et al. |
| 2009/0124704 A1 | 5/2009 | Jenkins |
| 2009/0135356 A1 | 5/2009 | Ando |
| 2009/0145066 A1 | 6/2009 | Pervan |
| 2009/0155612 A1* | 6/2009 | Pervan .................. B32B 21/02 428/498 |
| 2009/0208646 A1 | 8/2009 | Kreuder et al. |
| 2009/0294037 A1 | 12/2009 | Oldorff |
| 2009/0311433 A1 | 12/2009 | Wittmann |
| 2010/0092731 A1 | 4/2010 | Pervan et al. |
| 2010/0196678 A1 | 8/2010 | Vermeulen |
| 2010/0223881 A1 | 9/2010 | Kalwa |
| 2010/0239820 A1 | 9/2010 | Buhlmann |
| 2010/0291397 A1 | 11/2010 | Pervan et al. |
| 2010/0300030 A1 | 12/2010 | Pervan et al. |
| 2010/0307675 A1 | 12/2010 | Buhlmann |
| 2010/0307677 A1 | 12/2010 | Buhlmann |
| 2010/0319282 A1 | 12/2010 | Ruland |
| 2010/0323187 A1 | 12/2010 | Kalwa |
| 2010/0330376 A1 | 12/2010 | Trksak |

(56) References Cited

U.S. PATENT DOCUMENTS

| | | |
|---|---|---|
| 2011/0175251 A1 | 7/2011 | Ziegler et al. |
| 2011/0177319 A1 | 7/2011 | Ziegler et al. |
| 2011/0177354 A1 | 7/2011 | Ziegler et al. |
| 2011/0189448 A1 | 8/2011 | Lindgren et al. |
| 2011/0247748 A1 | 10/2011 | Pervan et al. |
| 2011/0250404 A1 | 10/2011 | Pervan et al. |
| 2011/0262720 A1 | 10/2011 | Riebel et al. |
| 2011/0283642 A1 | 11/2011 | Meirlaen et al. |
| 2011/0283650 A1 | 11/2011 | Pervan et al. |
| 2011/0293823 A1 | 12/2011 | Bruderer et al. |
| 2011/0293906 A1 | 12/2011 | Jacobsson |
| 2012/0263878 A1 | 10/2012 | Ziegler et al. |
| 2012/0263965 A1 | 10/2012 | Persson et al. |
| 2012/0264853 A1 | 10/2012 | Ziegler et al. |
| 2012/0288689 A1 | 11/2012 | Hansson et al. |
| 2012/0308774 A1 | 12/2012 | Persson et al. |
| 2013/0040118 A1 | 2/2013 | Buhlmann |
| 2013/0092314 A1 | 4/2013 | Zeigler et al. |
| 2013/0095315 A1* | 4/2013 | Pervan .................. B27N 3/007 428/323 |
| 2013/0111845 A1 | 5/2013 | Pervan et al. |
| 2013/0189534 A1 | 7/2013 | Pervan et al. |
| 2013/0269863 A1 | 10/2013 | Pervan et al. |
| 2013/0273244 A1 | 10/2013 | Vetter et al. |
| 2013/0273245 A1 | 10/2013 | Ziegler et al. |
| 2014/0044872 A1* | 2/2014 | Pervan .................... B05D 1/38 427/205 |
| 2014/0075874 A1 | 3/2014 | Pervan et al. |
| 2014/0171554 A1 | 6/2014 | Ziegler et al. |
| 2014/0178630 A1 | 6/2014 | Pervan et al. |
| 2014/0186610 A1 | 7/2014 | Pervan |
| 2014/0199558 A1 | 7/2014 | Pervan et al. |
| 2014/0234531 A1 | 8/2014 | Ziegler et al. |
| 2014/0329064 A1 | 11/2014 | Doehring |
| 2015/0017461 A1 | 1/2015 | Lindgren et al. |
| 2015/0079280 A1 | 3/2015 | Vetter et al. |
| 2015/0093502 A1 | 4/2015 | Ziegler et al. |
| 2015/0159382 A1 | 6/2015 | Pervan |
| 2015/0197942 A1 | 7/2015 | Pervan et al. |
| 2015/0197943 A1 | 7/2015 | Ziegler et al. |
| 2015/0275526 A1 | 10/2015 | Persson et al. |
| 2015/0298433 A1 | 10/2015 | Kalwa |
| 2016/0031189 A1 | 2/2016 | Pervan et al. |
| 2016/0114495 A1 | 4/2016 | Pervan et al. |
| 2016/0186318 A1 | 6/2016 | Pervan et al. |
| 2016/0368180 A1 | 12/2016 | Ziegler et al. |
| 2016/0369507 A1 | 12/2016 | Pervan |
| 2016/0375674 A1 | 12/2016 | Schulte |
| 2017/0120564 A1 | 5/2017 | Schulte |
| 2017/0165936 A1 | 6/2017 | Schulte |
| 2017/0190156 A1 | 7/2017 | Lundblad et al. |
| 2017/0305119 A1 | 10/2017 | Bergelin et al. |
| 2017/0348984 A1 | 12/2017 | Pervan et al. |
| 2018/0002934 A1 | 1/2018 | Pervan et al. |
| 2018/0291638 A1 | 10/2018 | Pervan |
| 2018/0370278 A1 | 12/2018 | Pervan et al. |
| 2019/0010711 A1 | 1/2019 | Pervan et al. |
| 2019/0202178 A1 | 7/2019 | Ziegler |
| 2019/0210329 A1 | 7/2019 | Ziegler et al. |
| 2019/0210330 A1 | 7/2019 | Ziegler et al. |

FOREIGN PATENT DOCUMENTS

| | | |
|---|---|---|
| CA | 2 852 656 A1 | 4/2013 |
| CH | 298894 A | 5/1954 |
| DE | 1 815 312 A1 | 7/1969 |
| DE | 7148789 U | 4/1972 |
| DE | 29 39 828 A1 | 4/1981 |
| DE | 33 34 921 A1 | 4/1985 |
| DE | 42 36 266 A1 | 5/1993 |
| DE | 202 14 532 U1 | 2/2004 |
| DE | 103 31 657 A1 | 2/2005 |
| DE | 20 2004 003 061 U1 | 7/2005 |
| DE | 10 2004 050 278 A1 | 4/2006 |
| DE | 20 2006 007 797 U1 | 8/2006 |
| DE | 10 2005 046 264 A1 | 4/2007 |
| DE | 10 2006 024 593 A1 | 12/2007 |
| DE | 10 2010 045 266 A | 3/2012 |
| EP | 0 129 430 A2 | 12/1984 |
| EP | 0 129 430 B1 | 1/1990 |
| EP | 0 355 829 A2 | 2/1990 |
| EP | 0 611 408 A1 | 12/1993 |
| EP | 0 592 013 A2 | 4/1994 |
| EP | 0 656 443 A1 | 6/1995 |
| EP | 0 611 408 B1 | 9/1996 |
| EP | 0 732 449 A1 | 9/1996 |
| EP | 0 744 477 A2 | 11/1996 |
| EP | 0 914 914 A2 | 5/1999 |
| EP | 0 732 449 B1 | 8/1999 |
| EP | 0 744 477 B1 | 1/2000 |
| EP | 1 035 255 A1 | 9/2000 |
| EP | 1 125 971 A1 | 8/2001 |
| EP | 1 136 251 A2 | 9/2001 |
| EP | 1 193 288 A1 | 4/2002 |
| EP | 1 209 199 A1 | 5/2002 |
| EP | 1 242 702 A1 | 9/2002 |
| EP | 1 249 322 A1 | 10/2002 |
| EP | 1 454 763 A2 | 9/2004 |
| EP | 1 242 702 B1 | 11/2004 |
| EP | 1 498 241 A2 | 1/2005 |
| EP | 1 507 664 A1 | 2/2005 |
| EP | 1 507 664 B1 | 2/2005 |
| EP | 1 584 378 A1 | 10/2005 |
| EP | 1 681 103 A2 | 7/2006 |
| EP | 1 690 603 A1 | 8/2006 |
| EP | 1 847 385 A1 | 10/2007 |
| EP | 1 961 556 A1 | 8/2008 |
| EP | 1 985 464 A1 | 10/2008 |
| EP | 1 997 623 A1 | 12/2008 |
| EP | 2 025 484 A1 | 2/2009 |
| EP | 1 454 763 B1 | 8/2009 |
| EP | 2 105 320 A1 | 9/2009 |
| EP | 2 213 476 A1 | 8/2010 |
| EP | 2 226 201 A1 | 9/2010 |
| EP | 2 246 500 A2 | 11/2010 |
| EP | 2 264 259 A2 | 12/2010 |
| EP | 2 272 667 A1 | 1/2011 |
| EP | 2 272 668 A1 | 1/2011 |
| EP | 2 305 462 A1 | 4/2011 |
| EP | 1 847 385 B1 | 9/2011 |
| FR | 2 873 953 A1 | 2/2006 |
| GB | 984 170 A | 2/1965 |
| GB | 1090450 | 11/1967 |
| GB | 2 248 246 A | 4/1992 |
| JP | 2-229002 A | 9/1990 |
| JP | 11-291203 A | 10/1999 |
| JP | 2000-301684 A | 10/2000 |
| JP | 4162799 B2 | 10/2000 |
| JP | 2001-287208 A | 10/2001 |
| JP | 2003-311717 A | 11/2003 |
| JP | 2003-311718 A | 11/2003 |
| JP | 2005-034815 A | 2/2005 |
| JP | 2005-074682 A | 3/2005 |
| JP | 2005-170016 A | 6/2005 |
| JP | 2005-219215 A | 8/2005 |
| JP | 3705482 B2 | 10/2005 |
| JP | 2005-307582 A | 11/2005 |
| JP | 2007-216692 A | 8/2007 |
| JP | 2007-268843 A | 10/2007 |
| JP | 2008-188826 A | 8/2008 |
| KR | 2002-0019815 A | 3/2002 |
| NZ | 225556 A1 | 2/1992 |
| SE | 469 326 B | 6/1993 |
| WO | WO 92/06832 A1 | 4/1992 |
| WO | WO 93/24295 A1 | 12/1993 |
| WO | WO 93/24296 A1 | 12/1993 |
| WO | WO 94/00280 A1 | 1/1994 |
| WO | WO 95/06568 A1 | 3/1995 |
| WO | WO 00/22225 A1 | 4/2000 |
| WO | WO 00/44576 A1 | 8/2000 |
| WO | WO 01/00409 A1 | 1/2001 |
| WO | WO 01/48333 A1 | 7/2001 |
| WO | WO 01/64408 A1 | 9/2001 |

(56) References Cited

FOREIGN PATENT DOCUMENTS

| WO | WO 01/68367 A1 | 9/2001 |
|---|---|---|
| WO | WO 01/92037 A2 | 12/2001 |
| WO | WO 02/42167 A2 | 5/2002 |
| WO | WO 02/42373 A1 | 5/2002 |
| WO | WO 03/078761 A1 | 9/2003 |
| WO | WO 03/095202 A1 | 11/2003 |
| WO | WO 2004/042168 A1 | 5/2004 |
| WO | WO 2004/050359 A1 | 6/2004 |
| WO | WO 2004/067874 A2 | 8/2004 |
| WO | WO 2005/054600 A1 | 6/2005 |
| WO | WO 2005/066431 A2 | 7/2005 |
| WO | WO 2005/080096 A2 | 9/2005 |
| WO | WO 2005/097874 A2 | 10/2005 |
| WO | WO 2005/116337 A1 | 12/2005 |
| WO | WO 2005/116361 A1 | 12/2005 |
| WO | WO 2006/007413 A1 | 1/2006 |
| WO | WO 2006/013469 A1 | 2/2006 |
| WO | WO 2006/015313 A2 | 2/2006 |
| WO | WO 2006/042651 A1 | 4/2006 |
| WO | WO 2006/043893 A1 | 4/2006 |
| WO | WO 2006/066776 A2 | 6/2006 |
| WO | WO 2006/126930 A1 | 11/2006 |
| WO | WO 2007/015669 A2 | 2/2007 |
| WO | WO 2007/015669 A3 | 2/2007 |
| WO | WO 2007/042258 A1 | 4/2007 |
| WO | WO 2007/059294 A2 | 5/2007 |
| WO | WO 2008/004960 A2 | 1/2008 |
| WO | WO 2008/004960 A8 | 1/2008 |
| WO | WO 2008/148771 A1 | 12/2008 |
| WO | WO 2009/065768 A1 | 5/2009 |
| WO | WO 2009/065769 A2 | 5/2009 |
| WO | WO 2009/065769 A3 | 5/2009 |
| WO | WO 2009/080772 A1 | 7/2009 |
| WO | WO 2009/080813 A1 | 7/2009 |
| WO | WO 2009/116926 A1 | 9/2009 |
| WO | WO 2009/124704 A2 | 10/2009 |
| WO | WO 2010/084466 A2 | 7/2010 |
| WO | WO 2010/087752 A1 | 8/2010 |
| WO | WO 2010/094500 A1 | 8/2010 |
| WO | WO 2011/087422 A1 | 7/2011 |
| WO | WO 2011/087423 A1 | 7/2011 |
| WO | WO 2011/129757 A1 | 10/2011 |
| WO | WO 2011/141851 A2 | 11/2011 |
| WO | WO 2012/004699 A2 | 1/2012 |
| WO | WO 2012/141647 A1 | 10/2012 |
| WO | WO 2013/056745 A1 | 4/2013 |

OTHER PUBLICATIONS

International Search Report issued in PCT/SE2014/051227, dated Feb. 12, 2015, 5 pages, ISA/SE Patent-och registreringsverket, Stockholm, SE.

Ayrilmis, Nadir, "Enhancement of dimensional stability and mechanical properties of light MDF by adding melamine resin impregnated paper waste," *International Journal of Adhesion & Adhesives*, 2012, pp. 45-49, vol. 33, ISSN 0143-7496, (article available online Nov. 10, 2011), Elsevier Ltd, NL.

Cavdar, A.D., et al., "Effect of waste melamine impregnated paper on properties of oriented strand board", *Materials and Design*, 2013, pp. 751-755, vol. 51, ISSN 0261-306, Elsevier Ltd., NL.

Le Fur, X., et al., "Recycling melamine-impregnated paper waste as board adhesives," *Holz als Roh-und Werkstoff*, published online Oct. 26, 2004, pp. 419-423, vol. 62, Springer-Verlag, DE.

Odian, George, "Principles of Polymerization," 1991, $3^{rd}$ Edition, 5 pages incl. pp. 122-123, John Wiley & Sons, Inc., New York, NY, USA.

Parquet International, "Digital Printing is still an expensive process," Mar. 2008, cover page/pp. 78-79, www.parkettmagazin.com.

Floor Daily, "Shaw Laminates: Green by Design," Aug. 13, 2007, 1 pg, Dalton, GA.

BTLSR Toledo, Inc. website. http://www.bltresins.com/more.html. "Advantages to Using Powdered Resins," May 26, 2007, 2 pages, per the Internet Archive WayBackMachine.

Nimz, H.H., "Wood," Ullmann's Encyclopedia of Industrial Chemistry, published online Jun. 15, 2000, pp. 453-505, vol. 39, Wiley-VCH Verlag GmbH & Co. KgaA, Weinheim, DE.

Engstrand, Ola (Contact)/Valinge Innovation, Technical Disclosure entitled "Fibre Based Panels With a Wear Resistance Surface," Nov. 17, 2008, IP.com No. IPCOM000176590D, IP.com PriorArtDatabase, 76 pages.

Engstrand, Ola (Contact)/Valinge Innovation, Technical Disclosure entitled "WFF Embossing," May 15, 2009, IP.com No. IPCOM000183105D, IP.com PriorArtDatabase, 36 pages.

Engstrand, Ola (Contact)/Valinge Innovation, Technical Disclosure entitled "VA063 VA064 Scattering and Powder Backing," Nov. 11, 2011, IP.com No. IPCOM000212422D, IP.com PriorArtDatabase, 34 pages.

Pervan, Darko, et al., U.S. Appl. No. 14/884,255, entitled "Method of Producing a Building Panel and a Building Panel," filed Oct. 15, 2015.

Extended European Search Report issued in EP 14854648.4, dated Jun. 1, 2017, European Patent Office, Munich, DE, 12 pages.

Pervan, Darko, et al. , U.S. Appl. No. 15/704,634 entitled "Fibre Based Panels With a Wear Resistance Surface," filed Sep. 14, 2017.

BTLSR Toledo, Inc. website. http://www.bltresins.com/more.html. "Advantages to Using Powdered Resins," May 26, 2007, 2 pages, per the Internet Archive WayBackMachine.

Persson, Hans, et al., U.S. Appl. No. 16/210,493 entitled "Powder Based Balancing Layer," filed Dec. 5, 2018.

Pervan, Darko, et al., U.S. Appl. No. 16/439,037 entitled "Fibre Based Panels with a Wear Resistance Layer," filed in the U.S. Patent and Trademark Office on Jun. 12, 2019.

\* cited by examiner

METHOD OF MANUFACTURING A BUILDING PANEL

CROSS REFERENCE TO RELATED APPLICATIONS

The present application claims the benefit of Swedish Application No. SE 1351240-5, filed on Oct. 18, 2013. The entire contents of Swedish Application No. SE 1351240-5 are hereby incorporated herein by reference in their entirety.

TECHNICAL FIELD

An embodiment of the disclosure relates to a method of manufacturing a building panel comprising a core, a decorative layer and a balancing layer.

TECHNICAL BACKGROUND

Floor panels, such as laminate floor panels or wood fibre floor (WFF) panels, are usually provided with a balancing layer on a rear side of the panel. The balancing layer may also be called a backing layer or counteracting layer. On the opposite side of the core, a decorative surface layer is arranged. The decorative layer may comprise a resin impregnated décor paper and a resin impregnated overlay paper. The decorative layer may also be a surface layer formed from a mix comprising wood fibres and a thermosetting binder as described in WO2009/065769. Such floor panels are marketed under the trademark NADURA®.

When the thermosetting binder in the decorative surface layer, for example, melamine formaldehyde resin, is cured, shrinking of the melamine formaldehyde resin leads to tension in the decorative surface layer. The internal stress formed in the decorative surface layer may cause warping of the panel. The tension at the front side of the panel should be compensated by a counteractive tension at the rear side of the panel. Therefore, a balancing layer is arranged on a rear side of the core opposite the decorative surface layer. The balancing layer is adapted to counteract and balance tension formed during curing of the decorative surface layer. The balancing layer may be a resin impregnated paper or a formed of a mix comprising wood fibres and a thermosetting binder of the type described in WO2012/141647.

An article by Le Fur et al. ("Recycling melamine-impregnated paper waste as board adhesive", Holz als Roh- and Werkstoff, Vol. 62, 2004, pp. 419-423, ISSN 0018-3768) discloses use of melamine impregnated paper offcuts and waste. In one approach, the melamine impregnated waste paper is used as a binder for forming a particleboard. The melamine waste paper was applied to wood particles, and no other binder was added in order to form the particleboard. In a second approach, melamine impregnated paper is used as a melamine substitute during the formulation of and preparation of liquid melamine-urea-formaldehyde (MUF) resins. The resin is centrifuged to separate the resin from the cellulose fibre originating from the melamine waste paper. The resin including the melamine part of the waste material was applied to wood particles for forming a particleboard.

It is a general desire of floor producers to decrease the cost for producing the floor panels. The balancing layer is one area where improvements relating to cost reduction is desirable.

SUMMARY

It is an object of at least embodiments of the disclosure to provide an improvement over the above described techniques and known art.

A further object of at least embodiments of the disclosure is to provide a balancing layer produced at lower cost than a conventional balancing layer.

A further object of at least embodiments of the disclosure is to use production waste resulting from manufacture of building panels, or from manufacture of components of building panels.

At least some of these and other objects and advantages that will be apparent from the description have been achieved by a method of manufacturing a building panel comprising a core, a decorative layer and a balancing layer, comprising applying a first mix comprising a binder and particles formed from production waste comprising resin impregnated paper on a first surface of a core, applying a decorative layer on a second surface of the core, and curing the first mix to form the balancing layer of the building panel.

The method may further comprise mixing the thermosetting binder and the particles formed from production waste comprising resin impregnated paper to form the first mix.

The binder is preferably a thermosetting binder. If it is not required to counteract forces formed by the surface layer by means of the balancing layer, the binder may be a thermoplastic binder and a protective layer is formed. A mixture of a thermosetting binder and a thermoplastic binder is also contemplated.

By production waste is meant both residues from production and left-overs, such as unconsumed material, intended for use in production. The production may be paper impregnation processes, lamination processes, pressing processes, etc.

The first mix is preferably a dry powder mix.

The thermosetting binder may be a separate binder. For example, the thermosetting binder is preferably not a resin separated from the production waste. The thermosetting binder may be separate from any resin in or obtained from the production waste. The thermosetting binder may be added in addition to the production waste and any resin therein. The thermosetting binder may be a fresh thermosetting binder. By fresh is meant not recycled. Preferably, the thermosetting binder has its reactivity maintained.

An advantage of embodiments of the disclosure is that production waste can be used for forming the balancing layer instead of going to waste. By replacing a part of the material of the balancing layer with production waste, the cost for producing the balancing layer can be reduced. Additionally, instead of paying for disposal of left-overs, such as unused material, for example, resin impregnated décor papers, backing papers and overlays, such material can be used for forming the balancing layer. Thereby, the amount of waste material can be reduced, and consequently also the cost for disposal of the waste material. Since the papers are impregnated with a binder, disposal of the waste material must follow current regulations due to the resin content, thus resulting in a higher cost for disposal compared to unimpregnated paper. Thereby, the cost can be reduced both by replacing material and reducing the cost that would otherwise have arisen for disposal of material.

A further advantage is that the processed production waste can improve the flowing properties of the first mix, thereby facilitating scattering the first mix for forming the balancing layer. Furthermore, if the production waste comprises substantially uncured binder, the substantially uncured binder in the processed production waste can be used as binder for the balancing layer and the amount of the thermosetting binder added to the first mix can be reduced. By substantially uncured is meant that the thermosetting binder being primary in its B-state, for example, at least 90 wt % of the thermosetting binder may be in the B-state. Thermosetting binders may be classified as A-, B-, and C-stage according to their extent of reaction compared to the extent of reaction at gelation. In an A-stage thermosetting binder, the extent of reaction is less than the extent of reaction at gelation, i.e. uncured. A B-stage thermosetting binder is close to the gel point. A C-stage thermosetting binder is well past the gel point. The A-stage thermosetting binder is soluble and fusible. The B-stage thermosetting resin is still fusible but is barely soluble. The C-stage thermosetting binder is highly crosslinked and both infusible insoluble. (*Principles of Polymerization, George Odian, 3$^{rd}$ edition*).

The production waste may comprise resin impregnated paper, such as resin impregnated décor paper, resin impregnated backing paper or resin impregnated overlay paper. The resin impregnated paper may be left-overs, such as décor papers having décors no longer used, or décor papers, backing papers and/or overlay papers which are old, e.g., which have been stored for a longer time than recommended. The resin impregnated papers may also be residues from manufacture. The residues may result from edge cutting, performed when cutting the edges of the paper after impregnation. The residues may result from edge trimming, performed after pressing when trimming the edges of the paper to the edge of the board.

The particles formed from production waste may comprise lignocellulosic material or cellulosic material, or a combination thereof. Consequently, the first mix may comprise lignocellulosic or cellulosic material originating from the resin impregnated papers of the production waste. Lignocellulosic or cellulosic material is preferably not removed from the production waste. Lignocellulosic or cellulosic material is preferably not separated from the resin of the production waste.

The first mix may be a powder mix, preferably a dry powder mix. The dry mix may have a moisture content of 2.5-9 wt %.

The thermosetting binder may be applied on the core in dry powder form.

The thermosetting binder may be in powder form, preferably in dry powder form, when mixed with the particles formed from production waste.

The particles formed from production waste may be formed by mechanically processing, preferably by grinding, production waste comprising resin impregnated paper. The step of mechanically processing the production waste comprising the resin impregnated paper into particles may be performed separately from the step of applying the first mix comprising the particles.

The step of mechanically processing the production waste may comprise grinding the resin impregnated paper.

The resin impregnated paper may be a resin impregnated décor paper, a resin impregnated backing paper or a resin impregnated overlay paper. By backing paper is also meant balancing paper, counteracting paper, etc.

The resin content of the total weight of the resin impregnated paper may be 25-85 wt %.

The resin impregnated paper may comprise a substantially uncured thermosetting binder. By substantially uncured is meant that the thermosetting binder being primary in its B-state, for example, at least 90 wt % of the thermosetting binder may be in the B-state. For example, the production waste may comprise substantially uncured resin impregnated paper. The thermosetting binder may be an amino resin, for example, melamine formaldehyde resin, urea formaldehyde, phenol formaldehyde, or a combination thereof.

The resin impregnated paper may comprise a substantially cured thermosetting binder. By substantially cured is meant that the thermosetting binder being primary in its C-state, for example, at least 90 wt % of the thermosetting binder may be in the C-state. For example, the production waste may comprise substantially cured resin impregnated paper. The thermosetting binder may be an amino resin, for example, melamine formaldehyde resin, urea formaldehyde, phenol formaldehyde, or a combination thereof.

The particles formed from production waste may comprise wear resistant particles, such as aluminium oxide (corundum). The production waste may, for example, originating from overlay papers comprising wear resistant particles.

The method may further comprise applying a stabilization fluid on the first mix, turning the core having the first mix applied thereto, such that the first mix is directed downwards from a surface of the core before applying the decorative layer.

The method may further comprise drying the first mix before turning the core.

The first mix may further comprise lignocellulosic or cellulosic particles separate from the particles formed from production waste. The cellulosic particles may at least partially bleached. By the lignocellulosic or cellulosic particles are meant particles being different from any the lignocellulosic material or cellulosic material originating from the production waste. The lignocellulosic or cellulosic particles are added to the particles formed from production waste.

The first mix may be formed by adding said particles formed from production waste to a mix comprising the thermosetting binder and said lignocellulosic or cellulosic particles.

The first mix may comprise 1-50% by weight of said particles formed from production waste, preferably 1-25% by weight, more preferably 1-10% by weight. The first mix may comprise additives, such as wetting agents, release agents, catalyst, etc. The first mix may further comprise pigments and/or hard particles, additives, etc.

The ration of the particles formed from production waste to the thermosetting binder of the first mix may be in the range of 1:20 to 1:5, such as about 1:10.

The decorative layer may comprise a resin impregnated décor paper. A resin impregnated overlay paper comprising wear resistant particles may be arranged on the décor paper.

The decorative layer may comprise a second mix comprising lignocellulosic or cellulosic particles and a thermosetting binder. The second mix may further comprise wear resistant particles. The second mix is preferably a powder mix.

The core may be a wood based board, such as Medium Density Board (MDF), High Density Board (HDF), particleboard, Oriented Strand Board (OSB), or plywood. The core may be a WPC (Wood Plastic Composite) or a thermoplastic core.

The decorative layer may comprise wear resistant particles.

According to a second aspect of the disclosure, a building panel is provided. The building panel may comprise a core having a first and a second surface, a balancing layer arranged on the first surface of the core, and a decorative layer arranged on the second surface of the core, wherein the balancing layer comprises a thermosetting binder and particles formed from production waste comprising resin impregnated paper.

The building panel may be a floor panel. The floor panel may be provided with a mechanical locking system.

The binder is preferably a thermosetting binder. If it is not required to counteract forces formed by the surface layer by means of the balancing layer, the binder may be a thermoplastic binder and a protective layer is formed. A mixture of a thermosetting binder and a thermoplastic binder is also contemplated.

The thermosetting binder may be a separate binder. For example, the thermosetting binder is preferably not a resin separated from the production waste. The thermosetting binder may be separate from any resin in or obtained from the production waste. The thermosetting binder may be added in addition to the production waste and any resin therein. The thermosetting binder may be a fresh thermosetting binder. By fresh is meant not recycled. Preferably, the thermosetting binder has its reactivity maintained.

The particles formed from production waste may comprise lignocellulosic or cellulosic material. Thereby, the balancing layer may further comprise lignocellulosic or cellulosic particles. Consequently, the balancing layer may comprise lignocellulosic or cellulosic material originating from the resin impregnated papers of the production waste. The lignocellulosic material or cellulosic material of the production waste may originate from the resin impregnated paper.

The balancing layer may further comprise lignocellulosic or cellulosic particles, or a combination thereof. By the lignocellulosic or cellulosic particles are meant particles being different from any lignocellulosic material or cellulosic material originating from the production waste.

The second aspect of the disclosure may incorporate all the advantage previously described relating to the method embodiment.

According to another aspect of the disclosure, a method of manufacturing a building panel comprising a core, a decorative layer and a balancing layer is provided. The method may comprise applying particles formed from production waste comprising resin impregnated paper on a first surface of a core, applying a decorative layer on a second surface of the core, and curing the first mix to a balancing layer of the building panel.

Preferably, the resin impregnated paper may comprise uncured resin. The uncured resin in the resin impregnated paper may create the counteracting forces of the balancing layer such that a balancing layer comprising no additional thermosetting binder can be obtained.

BRIEF DESCRIPTION OF THE DRAWINGS

The disclosure will by way of example be described in more detail with reference to the appended schematic drawings, which show embodiments of the disclosure.

DETAILED DESCRIPTION

FIGS. 1a-e illustrate a method of forming a building panel. The building panel may be a floor panel, a wall panel, a ceiling panel, a furniture component, a worktop, etc. The method comprises arranging a core 2 on a conveyor belt. The core 2 may be a board, such as a wood based board. The wood based board may, for example, be a HDF, MDF, particleboard, OSB, plywood, etc., or a WPC (Wood Plastic Composite). The core 2 may also be a thermoplastic core.

Figure 1A:
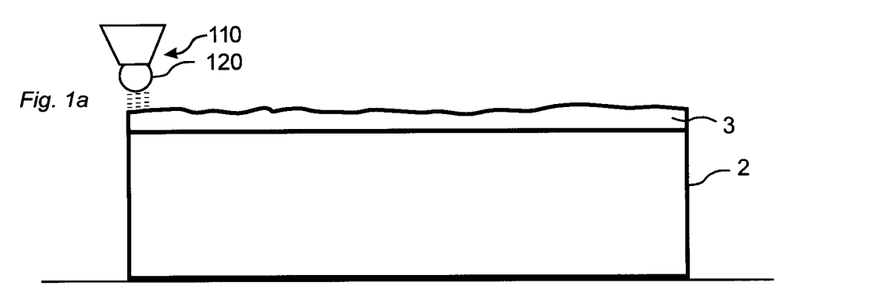
FIGS. 1a-e illustrate a method to form a balancing layer.

The method further comprises applying a first mix 3 on a first surface of the core 2. The first mix 3 comprises particles formed from production waste comprising resin impregnated paper and separate particles of thermosetting binder. The first mix 3 is applied as a powder.

By production waste is meant both residues from production and left-overs, such as unconsumed material intended for use in production.

Production of building panels, for example, floor panels, results in a certain amount of production waste. The production waste may, for example, be unconsumed material, such as décor papers, backing papers and overlay papers used for laminate flooring production. Décor papers may be printed resin impregnated papers. Overlay papers may also be resin impregnated and comprise wear resistant particles. The printed décor of décor papers may be outdated and therefore can no longer be used. Both overlay papers, backing papers and décor papers may have a limited storing time due to the resin included in the paper, which may start to cure. Unconsumed material may therefore be overlay papers, backing paper, and décor papers, which have been stored for a longer time than recommended.

The production waste may also be residues from production. Residues may originate from the production of the laminate papers, e.g., resin impregnated papers for use as décor papers, backing papers or overlay papers. When impregnating the papers, the edges of the papers are cut, in order to obtain a straight edge, in an edge cutting operation, resulting in production waste comprising substantially uncured binder. Residues may also originate from pressing of the resin impregnated papers to a core for forming a building panel having a laminate surface layer. After pressing, the edge of the resin impregnated papers extending beyond the edge of the core are trimmed, resulting in production waste comprising substantially cured binder.

Consequently, the production waste may comprise both substantially uncured and substantially cured binder, depending on the origin of the residues. If cured particles are included in the residues, the cured particles may function as hard particles facilitating scattering of the first mix 3.

The production waste may comprise both lignocellulosic material and/or cellulosic material, or a combination thereof. The lignocellulosic or cellulosic material originates from the resin impregnated paper of the production waste.

The production waste comprising resin impregnated paper is mechanically processed into particles. The production waste is preferably grinded. After grinding, the production waste is preferably sieved. The maximum particle size may be less than 1 mm, preferably less than 0.5 mm, preferably less than 0.3 mm.

The processed production waste, preferably grinded into particles, is mixed with a binder in a mixing station. The resulting first mix 3 is preferably stored in a container. The first mix 3 is preferably a homogenous mix. The binder is preferably a thermosetting binder, such as an amino resin, for example, melamine formaldehyde resin, urea formaldehyde, phenol formaldehyde, or a combination thereof. The thermosetting binder is preferably in powder form, and preferably mixed with the production waste in powder form. The thermosetting binder added to the production waste is separate from the resin impregnated paper of the production waste. For example, the thermosetting binder is preferably not a resin separated from the production waste. The thermosetting binder may be separate from any resin in or obtained from the production waste. The thermosetting binder may be added in addition to the production waste and any resin therein. The thermosetting binder is not a recycled binder. The thermosetting binder is newly produced. Preferably, the thermosetting binder has its reactivity maintained.

In one embodiment, wherein it is not required that the balancing layer counteracts the decorative layer, the binder may be a thermoplastic binder. In this embodiment, the balancing layer is a protective layer.

In one embodiment, the binder may comprise a mix of a thermosetting binder of the type described above and a thermoplastic binder.

In addition to the particles formed from processed production waste and the binder, the first mix 3 may also comprise lignocellulosic or cellulosic particles separate from any lignocellulosic or cellulosic material from, or obtained from, the resin impregnated paper of the production waste. The lignocellulosic or cellulosic particles are added to the first mix 3. The lignocellulosic or cellulosic particles may have maximum size of less than 1 mm, preferably less than 0.5 mm, preferably less than 0.3 mm. It is also contemplated that vegetable fibres as jute, linen, flax, cotton, hemp, bamboo, bagasse and sisal may be used. Also mineral fibres and carbon fibres may be used.

The first mix 3 may be formed by adding particles formed from the production waste to a powder mix comprising the thermosetting binder and the lignocellulosic or cellulosic particles. The particles may be mixed with the thermosetting binder and the lignocellulosic or cellulosic particles in a mixing station. The thermosetting binder content of the powder mix comprising the thermosetting binder may be 30-70% by, preferably 40-65% by weight, more preferably 50-60% by. The amount of thermosetting binder added depends on the concentration of uncured resin in the production waste used in the mix.

If needed, the mix formulation can be modified, such that thermoplastic particles, pigments, hard particles, release agents, wetting agents and similar materials are included into the mix. The thermoplastic particles may be mixed at random into the mix or applied as a separate thin layer and may be used to provide a sealing against moisture penetration into the core.

The first mix 3 may further comprise additives, such as wetting agents, release agents, catalysts, etc. The first mix 3 may also comprise pigments.

The first mix 3 is applied on a first surface of the core 2, preferably by scattering as shown in FIG. 1a. The first mix 3 is applied as a powder. The binder of the first mix 3 is applied as a powder. The first mix 3 is applied as a dry mix. The first mix 3 may be applied by a scattering device 110, for example, comprising a hopper, a roller 120 and optionally one or more nets. A first layer is thereby formed on the first surface of the core 2. The first layer is adapted to form a balancing layer 13.

The scattering device 110 may have capacity of scattering of 100-1000 g/m2 with a tolerance of +/-5% as measured using a calibration cup with an area of 100×100 mm cross- and lengthwise the board.

The scattering device 110 may comprise a needle belt and a scattering roller 120. The scattering roller 120 may be provided with needles in the range of about 30-120, preferably about 50-100, and most preferably about 70-90 needles per cm2. The needle length may be about 0.5-2.5 mm, preferably about 1-2 mm and most preferably about 1.5 mm. Several scattering devices 110 may be used to even out differences in the applied powder mixture.

Furthermore, the scattering device 110 may be provided with a needle belt with needles with a preferred length of about 15-20 mm, a preferred frequency in the range of about 500-1000 rpm preferably about 1000 rpm, and a stroke length of about +/-3 mm.

Figure 1B:
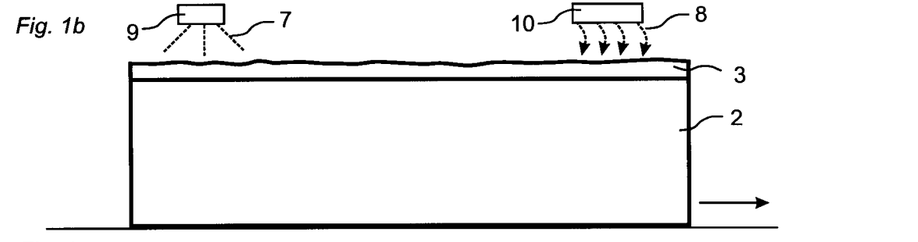

FIG. 1b shows that the first mix 3 applied on the core 2 is thereafter pre-stabilized by a stabilization fluid 7, preferably comprising water, which is applied by a stabilizing device 9. The amount of stabilization fluid may vary from 0 up to 200 g/m2, and for example from 5 to 100 g/m2.

The stabilization device 9 may apply the stabilization fluid by using steam, nozzle spray coating or ultra-sonic spray coating.

The stabilization fluid 7 may comprise solvents, such as non-polar solvents, polar aprotic solvents and polar protic solvents or mixtures thereof. Preferred solvents are polar protic solvents, such as isopropanol, ethanol and water. Most preferred is water.

The stabilization fluid 7 can further comprise additives, such as wetting agents, defoamers, release agents, anti-slip agents and catalysts.

The first layer 3 is thereafter preferably dried, as shown in FIG. 1b. Such drying can be performed off-line in a controlled environment or in-line by applying heat 8 with a heating device 10 on the first mix 3. The heating device 10 may comprise infrared light (IR).

Figure 1C:
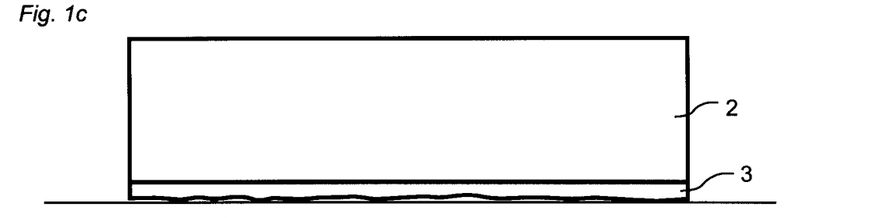

The stabilization 7 and the following drying 8, attaches the first layer 3 to the core 2, to such an extent that the core 2 with the first layer 3 can be turned 180° to bring the first layer 3 downwards, as shown in FIG. 1c, such that it may be transported further along the production line or be stacked on a pallet for intermediate storage before further production takes place.

Figure 1D:
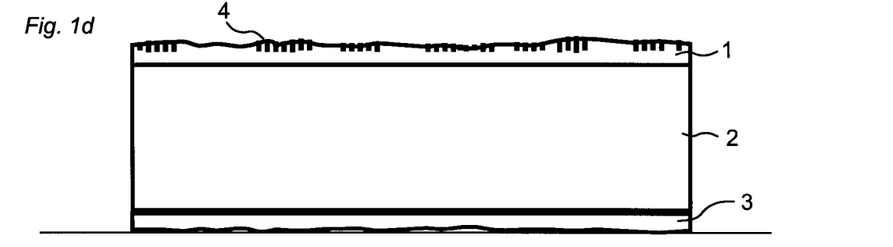

In FIG. 1d, a second mix 1 is applied to a second surface of the core 2 for forming a decorative layer 12. The second mix 1 may comprise lignocellulosic or cellulosic particles, a binder, preferably a thermosetting binder, and optionally wear resistant particles. The second mix 1 may further comprise pigments. A print 4 may be printed into the second mix, preferably by means of digital printing. The second mix 1 is preferably applied as a powder. The second mix 1 is preferably applied by scattering the second mix in powder form. The second mix 1 may be applied as one or several layers to form a second layer.

Figure 3:
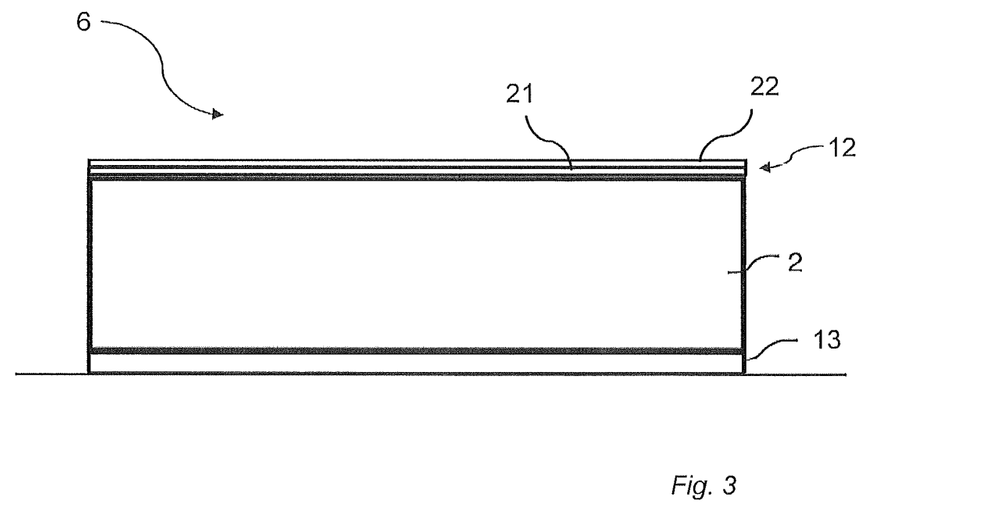
FIG. 3 illustrates a building panel wherein the decorative layer is laminate.

As an alternative to applying the second mix 1 for forming the decorative layer 12, the decorative layer 12 may be a laminate, as shown in FIG. 3. In this embodiment, a décor paper 21 is arranged on the second side of the core 2. An overlay paper 22 may be arranged on the décor paper 21. The overlay paper 22 may comprise wear resistant particles. The décor paper 21 and/or the overlay paper may be impregnated with a binder, such as a thermosetting binder, or may be unimpregnated. If using unimpregnated papers, a binder may be applied between the core and the décor paper, and/or between the décor paper and the overlay paper, and/or on the overlay paper.

As further alternatives, the decorative layer 12 may be a veneer layer, a wooden layer, a layer of thermoplastic material, etc. Any such layer may be combined with a powder based layer.

The core 2 with the decorative layer 12 and the first mix 3 adapted to form the balancing layer 13 is thereafter fed into a press where the layers are cured under heat and pressure.

Figure 1E:
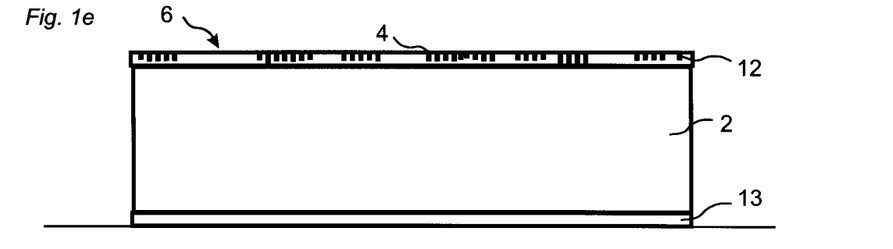

Thereby, a building panel 6 is formed, comprising a balancing layer 13 arranged on a first surface of the core 2, as shown in FIG. 1e.

Figure 2A:
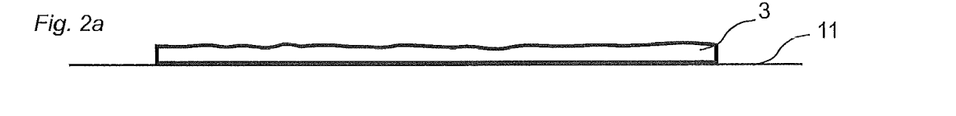
FIGS. 2a-d Illustrate a method to form a balancing layer.

FIGS. 2a-d shows an alternative method of manufacturing a building panel. In FIG. 2a, a first mix 3 of the type described above with reference to FIGS. 1a-e is applied on a carrier 11. The first mix 3 comprises particles formed from production waste comprising resin impregnated paper as described above. The first mix 3 further comprises a thermosetting binder of the above described type. The first mix 3 may further comprise lignocellulosic or cellulosic particles, additives, etc. as described above with reference to FIGS. 1a-e. The components are preferably mixed into a first mix as described above, preferably in powder form.

The first mix 3 is preferably scattered on the carrier 11, for example, by means of a scattering device 110 of the type described above, for example, comprising a hopper, a roller 120 and optionally one or more nets. The carrier 11 may be a conveyor belt. The carrier 11 may also be a paper sheet or a non-woven.

By scattering the first mix 3 on the carrier 11, a first layer is formed, adapted to form a balancing layer 13.

A stabilization fluid 7, preferably comprising water, may be applied to the first mix 3. The stabilization fluid 7 may be applied by a stabilizing device 9. The stabilization fluid 7 may further comprise additives, such as wetting agents, release agents, catalysts, etc. The first layer is thereafter preferably dried. Such drying can be performed off-line in a controlled environment or in-line by applying heat 8 with a heating device 10 on the mix 3. The heating device 10 may comprise infrared light (IR).

The first mix 3 may be dried to a loss on cure of 1.5-15 wt %. By "loss on cure" is meant the weight loss, calculated as weight percentage of the original weight, occurring when heating the impregnated paper at 160° C. for 5 minutes. The weight loss corresponds to moisture released from the impregnated paper. Under these conditions the released moisture is of two parts. The first part is the free moisture formed from water and/or other substances having a boiling point below 160° C. being trapped in the powder and the second part origins from the cross linking of the binder. Melamine formaldehyde resin cures during the heating up to 160° C. and the resin cross-links via a condensation reaction, i.e., water is released by the condensation reaction.

As an alternative or complement, the stabilization fluid 7 may be applied on the carrier 11 before applying the first mix 3.

In one embodiment, the first layer 3 is formed into a pre-preg as disclosed in U.S. patent application Ser. No. 13/445,379, which hereby is incorporated by reference in its entirety, for example by pre-pressing. The pre-preg can be handled separately and be stored.

Figure 2B:
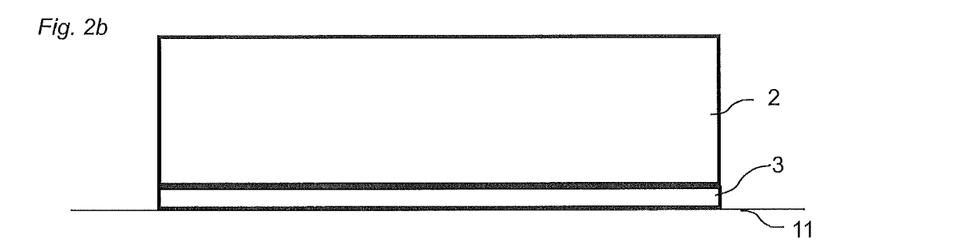

In FIG. 2b, a core 2 is arranged on the first layer 3. The core 2 may be of the type described above with reference FIGS. 1a-e. A first surface of the core 2 is abutting the first layer 3.

Figure 2C:
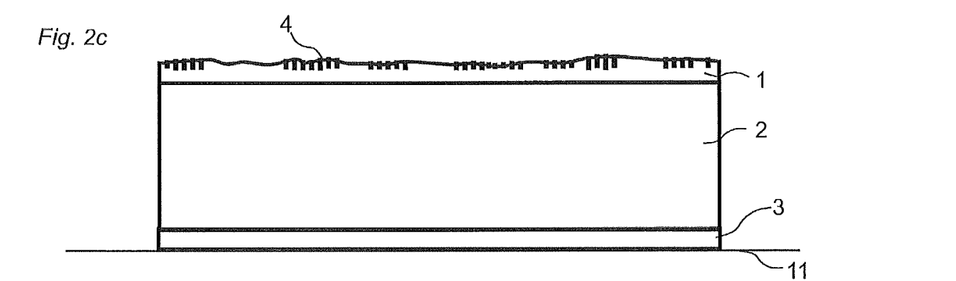

In FIG. 2c, a second mix 1 is applied on a second surface of the core 2 for forming a decorative layer 12. The second mix 1 may be scattered on the second surface of the core 2. The second mix 1 may comprise lignocellulosic or cellulosic particles, a binder, preferably a thermosetting binder, and optionally wear resistant particles. The second mix may further comprise pigments. A print 4 may be printed into the second mix 1, preferably by means of digital printing. The second mix 1 may be applied as one or several layers to form a second layer.

As an alternative or complement to applying a second mix 1, the decorative layer 12 may be a laminate, as shown in FIG. 3. In this embodiment, a décor paper 21 is arranged on the second side of the core 2. An overlay paper 22 may be arranged on the décor paper 21. The overlay paper 22 may comprise wear resistant particles. The décor paper 21 and/or the overlay paper 22 may be impregnated with a binder, such as a thermosetting binder, or may be unimpregnated. If using unimpregnated papers, a binder may be applied between the core and the décor paper, and/or between the décor paper and the overlay paper, and/or on the overlay paper.

As further alternatives, the decorative layer 12 may be a veneer layer, a wooden layer, a layer of thermoplastic material, etc. Any such layer may be combined with a powder based layer.

Figure 2D:
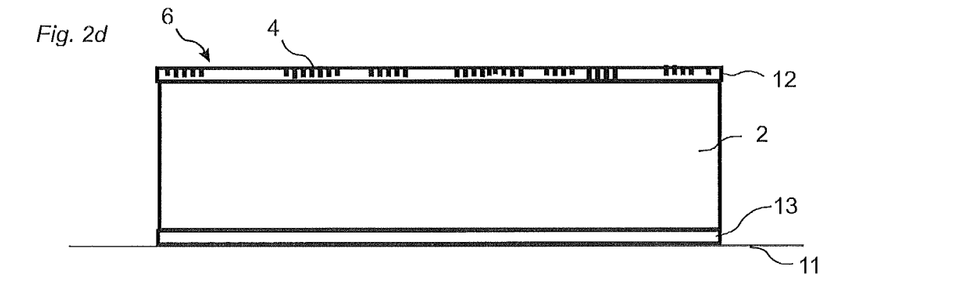

The core 2 with the decorative layer 12 and the first layer 3 adapted to form a balancing layer 13 is thereafter fed into a press where the layers are cured under heat and pressure. Thereby, a building panel 6 having a balancing layer 13 is formed, as shown in FIG. 2d.

FIG. 3 shows a building panel 6 having a core 2, a decorative layer 12 and a balancing layer 13. The core 2 may be a board, such as a wood based board. The wood based board may, for example, be a HDF, MDF, particle board, OSB, plywood, etc., or a WPC (Wood Plastic Composite). The core may also be a thermoplastic core.

The balancing layer 13 is arranged on a first surface of the core 2, adapted to face the subfloor when the building panel installed as a floor panel. The balancing layer 13 is formed of a first mix 3 of the type described above, comprising particles formed from production waste and a thermosetting binder.

The decorative layer 12 is arranged on a second surface of the core 2, adapted to face the interior of a room when the building panel is installed as floor panel. The decorative layer 12 comprises a décor paper 21 and an overlay paper 22. The décor paper 21 comprises a print. The décor paper 21 and the overlay paper 22 are preferably resin impregnated. The overlay paper 22 preferably comprises wear resistant particles, such as corundum.

In an alternative embodiment, the particles formed from production waste of the above described type and the binder of the above described type is applied to the core separately, and are not mixed prior to being applied to the core.

In the above description, balancing layer is used as equivalent to any protective layer.

It is contemplated that there are numerous modifications of the embodiments described herein, which are still within the scope of the disclosure as defined by the appended claims.

It is contemplated that no additional thermosetting binder is added to the particles formed from production waste comprising resin impregnated paper. Thereby, particles formed from processed production waste comprising resin impregnated paper forms the balancing layer. Substantially uncured resin in the production waste formed from resin impregnated paper may create the counteracting forces of the balancing layer such that no separate binder has to be added to the particles formed from production waste.

EXAMPLES

In the examples, production waste from the following resin impregnated papers were used:

Backing paper having a paper weight of 140 g/m2 impregnated with 170 g/m2 melamine formaldehyde resin, which has been stored approximately one year.

Décor paper having a paper weight of 80 g/m2 impregnated with 80 g/m2 melamine formaldehyde resin, which has been stored approximately one year.

Overlay paper having a paper weight of 25 g/m2 impregnated with 75 g/m2 melamine formaldehyde resin, which has been stored over one year.

The papers were divided into coarse particles and then milled in a hammer mill to a powder having a particle size of less than 1000 μm.

A powder backing mix was prepared comprising 56 wt % of spray-dried melamine formaldehyde resin (MF), 1 wt % Al2O3, 3 wt % pigments and 40 wt % of cellulosic or lignocellulosic particles.

Eight different mixes were prepared, wherein the powder backing mix was mixed with a varying amount of particles formed from production waste comprising resin impregnated paper according to the following.

|  | Production waste from resin impregnated papers | Powder backing mix |
| --- | --- | --- |
| Example 1 | 0 wt % | 100 wt % |
| Example 2 | 5 wt % | 95 wt % |
| Example 3 | 10 wt % | 90 wt % |
| Example 4 | 25 wt % | 75 wt % |
| Example 5 | 50 wt % | 50 wt % |
| Example 6 | 75 wt % | 25 wt % |
| Example 7 | 90 wt % | 10 wt % |
| Example 8 | 100 wt % | 0 wt % |

450 g/m2 of each mix was applied on a HDF board having a thickness of 9.7 mm for forming a balancing layer. Water was applied on the mix in an amount of approximately 20 g/m2. The board having the mix applied thereon was pressed at 40 bar during 35 seconds at a temperature of 160° C.

All resulting boards having a balancing layer formed by any one of the eight examples created a counteracting force, resulting in a board having a convex shape. All eight examples resulted in counteracting forces of comparable strength to a conventional backing paper or a powder backing layer of the type disclosed in WO2012/141647, which hereby is incorporated by reference in its entirety.

The invention claimed is:

1. A method of manufacturing a building panel comprising a core, a decorative layer and a balancing layer, comprising
applying a first mix comprising a thermosetting binder and particles formed from production waste comprising resin impregnated paper on a first surface of a core,
turning the core having the first mix applied thereto such that the first mix is directed downwards from a surface of the core before applying a decorative layer,
applying a decorative layer on a second surface of the core, and
curing the first mix to form the balancing layer of the building panel,
wherein the first mix comprises 1-50% by weight of said particles formed from production waste,
wherein the resin impregnated paper comprises a substantially cured thermosetting binder.

2. A method according to claim 1, wherein the particles formed from production waste comprise lignocellulosic material or cellulosic material.

3. A method according to claim 1, wherein the first mix is a dry powder mix.

4. A method according to claim 1, wherein the thermosetting binder is applied on the core in dry powder form.

5. A method according to claim 1, wherein the thermosetting binder is in powder form when mixed with the particles formed from production waste.

6. A method according to claim 1, wherein the particles formed from production waste comprise wear resistant particles.

7. A method according to claim 1, wherein the particles formed from production waste are formed by mechanically processing production waste comprising resin impregnated paper.

8. A method according to claim 1, wherein the resin impregnated paper is a resin impregnated décor paper, a resin impregnated backing paper or a resin impregnated overlay paper.

9. A method of manufacturing a building panel comprising a core, a decorative layer and a balancing layer, comprising
applying a first mix comprising a thermosetting binder and particles formed from production waste comprising resin impregnated paper on a first surface of a core,
applying a decorative layer on a second surface of the core,
curing the first mix to form the balancing layer of the building panel,
the method further comprising:
applying a stabilization fluid on the first mix,
turning the core having the first mix applied thereto such that the first mix is directed downwards from a surface of the core before applying the decorative layer,
wherein the resin impregnated paper comprises a substantially cured thermosetting binder.

10. A method according to claim 9, further comprising drying the first mix before turning the core.

11. A method according to claim 1, wherein the first mix further comprises lignocellulosic or cellulosic particles separate from the particles formed from product waste.

12. A method according to claim 11, wherein the first mix is formed by adding the particles formed from product waste to a mix comprising the thermosetting binder and said lignocellulosic or cellulosic particles.

13. A method according to claim 1, wherein the decorative layer comprises a décor paper.

14. A method according to claim 1, wherein the decorative layer comprises a second mix comprising lignocellulosic or cellulosic particles and a thermosetting binder.

15. A method according to claim 1, wherein the core is a wood based board.

16. A method according to claim 1, wherein the decorative layer comprises wear resistant particles.

17. A method according to claim 1, wherein the production waste is sieved so that the maximum particle size is about 1 mm.

18. A method according to claim 1, further comprising forming the first mix by adding the particles formed from the production waste to a powder mix comprising the thermosetting binder, wherein the thermosetting binder is 30-70% of the powder mix.

19. A method according to claim 18, wherein the powder mix further comprises lignocellulosic and/or cellulosic particles.

20. A method according to claim 1, further comprising curing, in a single step, under heat and pressure, the decorative layer on the second surface of the core, and the first mix to form the balancing layer of the building panel.

21. A method according to claim 9, wherein the production waste is sieved so that the maximum particle size is about 1 mm.

22. A method according to claim 9, further comprising forming the first mix by adding the particles formed from the production waste to a powder mix comprising the thermosetting binder, wherein the thermosetting binder is 30-70% of the powder mix.

23. A method according to claim 22, wherein the powder mix further comprises lignocellulosic and/or cellulosic particles.

24. A method according to claim 9, further comprising curing, in a single step, under heat and pressure, the decorative layer on the second surface of the core, and the first mix to form the balancing layer of the building panel.

\* \* \* \* \*